United States Patent Office 3,544,522
Patented Dec. 1, 1970

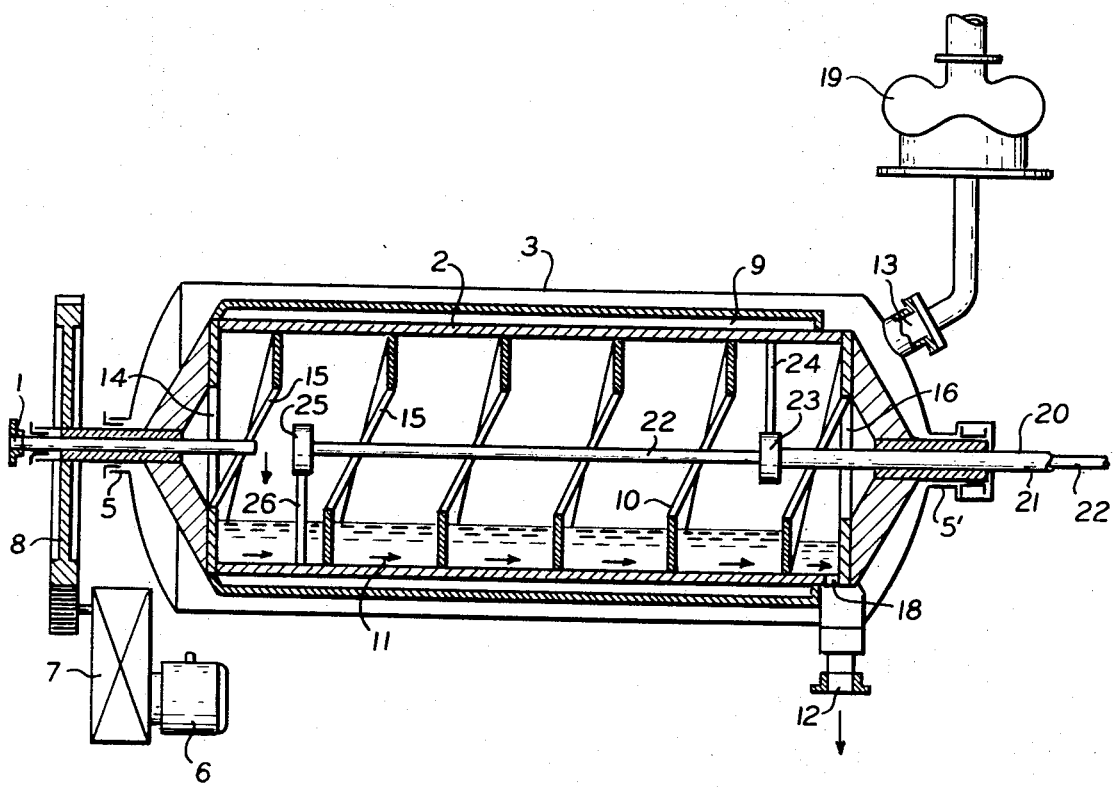

3,544,522
CONTINUOUS MANUFACTURE OF POLYMERS
Wolf-Diether Hahn, Frankfurt am Main, Germany, assignor, by mesne assignments, to Inventa AG für Forschung und Patentverwertung, Zurich, Switzerland, a corporation of Switzerland
Filed Aug. 3, 1965, Ser. No. 476,902
Int. Cl. C08g 17/08
U.S. Cl. 260—75                                   4 Claims

ABSTRACT OF THE DISCLOSURE

Process for continuous production of the polymer from reactants suitable for production of the polymer by polymerizing the reactants in liquid phase, which comprises:
 introducing the reactants into one end of a horizontally extending drum having an internal, continuous, helical baffle fixedly secured to and extending inwardly from the internal surface of the drum,
 the reactants being introduced so that the drum is only partially filled and reactant material between successive turns of the baffle is separated by the baffle, the level of the material in the drum being such that the material does not overflow the baffles,
 rotating the drum in a direction to advance the reactant material by the baffle toward the other end of the drum,
 withdrawing the reactant material as the polymer product from said other end of the drum.

---

In order to accelerate organic reactions, which are known to take place at a slower rate than inorganic reactions, it is necessary to provide for intimate contacting of material, and usually for fairly high temperatures, and to provide also for the use of pressure. Since organic reactions are all equilibrium reactions, it is furthermore advantageous to remove at least one end product from the equilibrium as quickly as possible.

The equilibrium process group includes condensation polymerization reactions, wherein simple substances of low molecular weight, such as water or alcohols, are split off in addition to the macromolecular polymerization product. In this case, too, it is advantageous to remove rapidly from the reaction mixture the low-molecular compounds which usually are produced in vapor or gas form, for the purpose of increasing the yield of the desired polymer.

Since reaction mixtures with relatively high viscosities are produced in the manufacture of plastics by condensation polymerization, it is especially important to keep the surface area of the material being reacted as large as possible, in order on the one hand to assure a good intermixing, and on the other hand to facilitate the unimpeded issuance of the small, vapor or gas molecules that form.

For this purpose numerous apparatus have been developed, such as the so-called thin-layer evaporator. For example, in inorganic chemistry it is in the prior art to remove water adhering to solid products in so-called rotary or calcination kilns, wherein the constant rotation always produces a surface-area enlargement and the water to be removed easily escapes.

All these known apparatus have disadvantages. Most of them are very expensive and costly to operate. Maintenance and cleaning costs are high. It is true that rotary and calcination kilns are very simple in design and low in cost, but the kilns that have been known hitherto have been designed only for the treatment of solids. They make possible the performance only of simple reactions such as the removal of water, but they are not suitable for the performance of complicated organic chemical reactions, since in these reactions, it is not just surface area that is important, but it is also important to see to it that the residence time of the reaction mixture is as uniform as possible.

The invention describes a process for the continuous manufacture of organic condensation polymers in a liquid phase, wherein the reaction vessel is a rotary drum with helical interior fittings.

According to the invention, the rotatory speed of the drum is adjustable, and the drum can be operated at elevated or reduced pressure.

The rotary drum of the invention has an inlet connection at one for the material to be put into it, and at the other end it has an outlet connection for the discharge of the reaction product, and an opening for the removal of gaseous or vaporous substances.

Another feature of the rotary drum consists in the fact that the walls and/or the helical interior fittings can be wholly or partially heated or cooled.

The rotary drum is preferably horizontally disposed or tilted at a small angle, e.g. 5°, downward at the outlet.

According to a further development of the invention, the rotary drum can be surrounded by an additional pressure vessel, which can be evacuated, heated and/or cooled.

The rotary drum of the invention has the advantage that, with it, it is not only possible to perform organic reactions in thin layers, but also to increase considerably the time of stay of the substances reacting with one another. Furthermore, the apparatus of the invention always assures a very uniform time of stay, independently of the amount of reaction materials put through it. This equalization of the effective time of stay has not been achieved in any apparatus of the prior art. This, together with the continually renewing surface of the reaction mixture, has the advantage that intermixing takes place rapidly, intensely and uniformly. Even with batches of different sizes, it is possible always to obtain an end product with uniform properties, which is an advantage in the manufacture of liquid, linear condensation polymers to be formed into filaments. The present invention is not limited to the continuous production or organic condensation polymers in liquid phase: it is possible with this apparatus also to manufacture intermediates of these condensation polymers. For example, it is possible to perform esterifications and reesterifications, always achieving high yields. Due to the high rate of transformation in volume per unit of time, the reactions performed with the rotary drum are very economical. The products can be removed from the reaction vessel very easily without operational expenditure. On account of the possibility of working under pressure or vacuum at all possible temperatures, the apparatus of the invention is very versatile. The apparatus distinguishes itself from ordinary apparatus by its economical feasibility.

The process of the invention and the apparatus for the performance of the process can be understood from the accompanying drawing and the following examples. The drawing is an elevation view of a device according to the invention.

The apparatus includes a rotatably mounted, horizontally extending drum 2 have an internal continuous helical baffle 10 extending inwardly from the internal surface of the drum 2. The baffle at its outer periphery is fixedly connected with the drum, as by welding. Further, the baffle terminates short of the center of the drum. Thereby, the successive turns of the baffle are communicated by openings 15 defined by the inner periphery of the baffle. The drum is mounted on trunnions 5, 5' and is outfitted with a centrally disposed feed pipe 1.

Gearing 8 is connected to the drum at the inlet end and is also connected, through a variable speed transmission 7, to drive motor 6. Accordingly, the drum can be rotated at different rates. Opposite the inlet end, the drum is provided with an opening 18 for discharge of material 11 which is advanced through the drum by rotation thereof. A vessel 3 encloses and hermetically seals the drum, and is outfitted with conduit means 13 for communicating the vessel with a pressure bearing device, for example the vacuum pump 19. Further, means are provided for communicating the interior of the drum 2 and the vessel for communicating successive turns of the baffle 10 with the vessel 3 and therethrough with the pressure bearing device. Thus, the inlet end of the drum is provided with an opening 14 and the outlet end of drum is provided with an opening 16, each of these openings communicating the inside of the drum with the inside of the vessel 3. Further, the openings between successive turns of the helical baffle 10, which are defined by the inner periphery 15 of the baffle, communicate the space between successive turns of the baffle with the openings 14 and 16 in the ends of the drum. The apparatus is also provided with means for heating or cooling the drum. Thus, the apparatus is provided with a jacket 9 through which a heating or cooling medium can be passed. A conduit system 20 comprising an outer pipe 21 and an inner pipe 22 passes into the drum from the outlet end thereof. Within the drum is a pivot fitting 23 connected on its inlet side to the outer pipe 21 for forward communication therewith, and connected on its outlet side to conduit 24 which is communicated with the inside of the jacket 9. The conduit 24 turns with the drum, the pivot fitting 23 permitting this. The inner pipe 22 passes through the pivot fitting 23 and onto the pivot fitting 25. The pivot fitting 25 has its inlet side connected to the pipe 22 and its outlet side connected to the conduit 26 which communicates with the inside of the jacket 9. The conduit 26 turns with the drum, the pivot fitting 25 permitting such movement. Heating or cooling fluid can be passed through the jacket utilizing the pipe in pipe system 20.

EXAMPLE 1

Manufacture of polyethylene glycol terephthalate (a) Manufacture of the dimethyl ester.—A suspension of 10.0 kg. of terephthalic acid in 38.4 kg. of methanol is fed into the drum at 1. The drum rotates at a rate of 2 revolutions per hour. After a reaction time of 5 hours at a temperature of 180° C., the esterification had ended. The yield of terephthalic acid dimethyl ester amounted to 10.8 kg. (92.5% of the theory). In this case no vapors were drawn off through the outlet 13. The reactor itself was under a pressure of 40 kg. per sq. cm.

(b) Re-esterification of the dimethyl ester to bis-(2-hydroxyethyl)-terephthalate.—A solution of 38.8 kg. of dimethyl terephthalic acid ester in 27.3 kg. of diethylene glycol is heated to a temperature of 180° C., and 22 g. of zinc acetate are added as an esterification catalyst. The mixture is fed into the drum at 1, and the drum rotates at 3 revolutions per hour. After a reaction time of 3 hours, in which the temperature rises to 240° C., and at a pressure of 760 torr, the re-esterification was ended. The yield of bis-(2-hydroxyethyl)-terephthalate amounted to 41.0 kg. The degree of re-esterification amounted to 99.5% of the theory.

(c) Manufacture of the primary condensation product.—41.0 kg. of bis-(2-hydroxethyl)-terephthalate with a condensation polymerization degree of about 2 and a viscosity of 4 cp. was heated to a temperature of 230 to 350° C. and fed to the drum at 1. The drum revolved at a speed of 8 revolutions per hour. A vacuum of about 180 torr was applied to the drum. The temperature of the reaction mixture rose during the time of stay of 1.5 hours to 260–270° C. and the viscosity rose to about 40 p. The end product had an intrinsic viscosity of 0.15 according to a measurement made in a mixture of 60 wt. percent phenol and 40 wt. percent 1,1,2,2-tetrachlorethane.

(d) Manufacture of the condensation polymer.—40 kg. of a primary condensation product with an intrinsic viscosity of 0.18 were heated to 260–270° C. and fed to the rotary drum at 1. The drum was under a vacuum of 0.2 torr and rotated at a speed of 3 revolutions per hour. After a period of 4 hours, the viscosity rose to about 1000 p. The end product had an intrinsic viscosity of 0.65.

EXAMPLE 2

Manufacture of polyhexamethylene diamine adipate (a) Manufacture of the primary condensation product.—An aqueous solution of 30 kg. of hexamethylene diamine adipate in 20 kg. of water is fed at 260° C. to the reactor which is under 25 atmospheres of overpressure. After a period of 2 hours and a drum speed of 4 r.p.h., the product reaches a temperature of 275° C. and a relative solution viscosity in sulfuric acid of 1.9. The pressure is relieved in an intermediate vessel.

(b) Manufacture of the condensation polymer.—The primary condensation product leaving the rotary drum at a temperature of 275° C. flows again to a reactor according to the invention, but this one is under a vacuum. After a time of stay of 2.5 hours and a drum speed of 2 r.p.m., at a uniform temperature of 275° C., the product reaches a relative viscosity of 2.5.

Thus, the invention provides a process for the continuous production of polymer from reactants suitable for the production thereof, the polymerization being in liquid phase. The process involves introducing the reactants into one end of a horizontally extending drum having an internal, continuous, helical baffle extending inwardly from the internal surface of the drum. The reactants are introduced so that the drum is only partially filled and the reaction mass between successive turns of the baffle is separated by the baffle. Thus, the material does not pass from between one turn of the baffle to between the next turn of the baffle by overflowing the baffle; rather, the material is advanced through the reactor by the baffle acting in the manner of a screw conveyor on the material. Rotation of the drum serves to advance the material to the end opposite the inlet end, and the material can then be withdrawn.

The invention particularly contemplates the processing of organic polymers, by which is meant polymers having carbon in the polymer chain.

While the invention has been described with respect to particular embodiments thereof, these embodiments are merely representative of the invention and do not serve to define the limits thereof.

What is claimed is:

1. Process for continuous production of organic filament-forming condensation polymer from reactants suitable for production of the polymer by polymerizing the reactants in liquid phase, which comprises:

introducing the reactants into one end of a horizontally extending drum having an internal, continuous, helical baffle fixedly secured to and extending inwardly from the internal surface of the drum and terminating short of the center of the drum.

the reactants being introduced so that the drum is only partially filled and reactant material between successive turns of the baffle is separated by the baffle, the level of the material in the drum being such that the material does not overflow the baffles, rotating the drum in a direction to advance the reactant material by the baffle toward the other end of the drum, withdrawing the reactant material as the polymer product from said other end of the drum.

2. Process according to claim 1, wherein the reactants are organic and the polymer is a liquid organic polymer.

3. Process according to claim 1 wherein the polymer is polyethylene glycol terephthalate.

4. Process according to claim 1 wherein the polymer is polyhexamethylene diamine adipate.

References Cited

UNITED STATES PATENTS

| | | | |
|---|---|---|---|
| 2,948,593 | 8/1960 | Larson | 23—286 XR |
| 2,998,307 | 4/1961 | Walker | 23—286 XR |
| 3,220,804 | 11/1965 | Bachmann et al. | 23—286 |
| 3,057,702 | 10/1962 | Pierce et al. | 260—75 MXR |
| 3,118,739 | 1/1964 | Atkinson et al. | 260—75 MXR |
| 3,192,184 | 6/1965 | Brill et al. | 260—75 M |
| 3,248,180 | 4/1966 | Kilpatrick | 260—75 MXR |
| 3,376,353 | 4/1968 | Tate | 260—75 MUXR |

FOREIGN PATENTS 1,017,463  1/1966  Great Britain.

OTHER REFERENCES

Chemical Abstracts, vol. 57, December 1962, p. 15354f.

WILLIAM H. SHORT, Primary Examiner

L. P. QUAST, Assistant Examiner

U.S. Cl. X.R.

23—286; 259—3, 14, 30; 260—95, 475